United States Patent
Islam et al.

(10) Patent No.: US 10,405,348 B2
(45) Date of Patent: Sep. 3, 2019

(54) SLOTTED TRANSMISSION AND DIRECTIONAL RECEPTION OF RTS

(71) Applicant: QUALCOMM Incorporated, San Diego, CA (US)

(72) Inventors: Muhammad Nazmul Islam, Edison, NJ (US); Sundar Subramanian, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 15/493,946

(22) Filed: Apr. 21, 2017

(65) Prior Publication Data

US 2018/0115994 A1   Apr. 26, 2018

Related U.S. Application Data

(60) Provisional application No. 62/412,704, filed on Oct. 25, 2016.

(51) Int. Cl.
*H04W 74/08* (2009.01)
*H04W 74/00* (2009.01)
(Continued)

(52) U.S. Cl.
CPC ...... *H04W 74/0816* (2013.01); *H04B 7/0617* (2013.01); *H04B 7/0695* (2013.01);
(Continued)

(58) Field of Classification Search
CPC . H04B 7/0617; H04B 7/0695; H04W 74/006; H04W 74/08
See application file for complete search history.

(56) References Cited

U.S. PATENT DOCUMENTS

| 7,206,610 B2 | 4/2007 | Iacono et al. |
| 8,422,961 B2 | 4/2013 | Kafle |

(Continued)

FOREIGN PATENT DOCUMENTS

WO    2015110153 A1    7/2015

OTHER PUBLICATIONS

International Search Report and Written Opinion—PCT/US2017/054778—ISA/EPO—dated Jan. 2, 2018.
(Continued)

*Primary Examiner* — Brandon M Renner
*Assistant Examiner* — Jay L Vogel
(74) *Attorney, Agent, or Firm* — Arent Fox, LLP; Clint R. Morin

(57) ABSTRACT

A receiving device may remain in omni-directional mode while receiving RTS messages from transmitting devices. Multiple devices may transmit RTS messages at the same time, causing interference and preventing intended recipients of the RTS messages from transmitting a CTS message. To increase medium reuse, RTS may be transmitted and received in a slotted and directional manner. A receiving device may select a sweeping pattern for receiving transmission from neighboring devices. The receiving device may also determine one or more time slots allocated to each of the neighboring devices for receiving transmissions from the neighboring devices. The receiving device may transmit an indication of the sweeping pattern and the time slots to one or more of the neighboring devices. Subsequently, during one of the indicated time slots, the receiving device may perform a beam sweep to receive one or more RTS messages from one of the neighboring devices.

43 Claims, 13 Drawing Sheets

(51) Int. Cl.
*H04B 7/06* (2006.01)
*H04W 16/28* (2009.01)

(52) U.S. Cl.
CPC ......... *H04W 74/006* (2013.01); *H04W 74/08* (2013.01); *H04W 16/28* (2013.01)

(56) References Cited

U.S. PATENT DOCUMENTS

| | | | |
|---|---|---|---|
| 8,767,683 B2 | 7/2014 | Liu et al. | |
| 2007/0115904 A1* | 5/2007 | Chen | H04W 72/1278 |
| | | | 370/338 |
| 2009/0232109 A1 | 9/2009 | Nandagopalan et al. | |
| 2010/0177757 A1* | 7/2010 | Kim | H04W 74/0816 |
| | | | 370/338 |
| 2010/0279628 A1* | 11/2010 | Love | H04L 5/003 |
| | | | 455/70 |
| 2011/0287796 A1 | 11/2011 | Jain et al. | |
| 2011/0316744 A1* | 12/2011 | Morioka | H04W 72/046 |
| | | | 342/367 |
| 2012/0051251 A1* | 3/2012 | Seo | H04W 74/085 |
| | | | 370/252 |
| 2013/0021952 A1* | 1/2013 | Jeong | H04W 74/006 |
| | | | 370/277 |
| 2013/0229996 A1* | 9/2013 | Wang | H04W 72/0413 |
| | | | 370/329 |
| 2015/0288427 A1 | 10/2015 | Wang et al. | |
| 2016/0191409 A1* | 6/2016 | Li | H04L 47/70 |
| | | | 709/226 |
| 2016/0380685 A1* | 12/2016 | Kasher | H04B 7/0617 |
| | | | 370/329 |
| 2017/0055298 A1* | 2/2017 | Pawar | H04L 5/1469 |

OTHER PUBLICATIONS

Ulukan E., et al., "Angular MAC: a Framework for Directional Antennas in Wireless Mesh Networks", Wireless Networks; The Journal of Mobile Communication, Computation and Information, Kluwer Academic Publishers, DO, vol. 14. No. 2, Jul. 13, 2007, pp. 259-275, XP019582175, ISSN: 1572-8196.

Ueda T., et al., "An Efficient MAC Protocol with Direction Finding Scheme in Wireless Ad Hoc Network using Directional Antenna", IEEE, Radio and Wireless Conference, 2003, pp. 233-236.

* cited by examiner

SLOTTED TRANSMISSION AND DIRECTIONAL RECEPTION OF RTS

CROSS-REFERENCE TO RELATED APPLICATION(S)

This application claims the benefit of U.S. Provisional Application Ser. No. 62/412,704, entitled "SLOTTED TRANSMISSION AND DIRECTIONAL RECEPTION OF RTS" and filed on Oct. 25, 2016, which is expressly incorporated by reference herein in its entirety.

BACKGROUND

Field

The present disclosure relates generally to communication systems, and more particularly, to slotted transmission and directional reception of request to send (RTS) messages.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

In a wireless communication system, such as one compliant with the IEEE 802.11ad standard and/or any other communication standard, a receiving device may remain in omni-directional mode while receiving RTS messages from one or more transmitting devices. When the system or network becomes more congested, multiple devices may transmit RTS messages at the same time, causing interference to other devices. Due to the interference, intended recipients of the RTS messages may not transmit a clear to send (CTS) message that enables subsequent data transmission.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In a wireless communication system, such as one compliant with the IEEE 802.11ad standard and/or any other communication standard, a receiving device may remain in omni-directional mode while receiving RTS messages from one or more transmitting devices. When the system becomes more congested, multiple devices may transmit RTS messages at the same time, causing interference to other devices. Due to the interference, intended recipients of the RTS messages may not receive the RTS message, and therefore, may not transmit a CTS message, which would prevent subsequent data transmission.

To reduce network congestion and increase medium reuse, RTS may be transmitted and received in a slotted and directional manner. In one configuration, a receiving device may perform beam training with neighboring transmitting devices to determine the spatial directions in which each of the neighboring transmitting devices may transmit RTS messages. The receiving device may then select a sweeping pattern for receiving RTS messages from each of the neighboring transmitting devices. The receiving device may also determine one or more time slots allocated to each of the neighboring transmitting devices for receiving RTS messages from the neighboring transmitting devices. Each time slot allocated to a transmitting device may be associated or correspond to the sweeping pattern selected for the transmitting device. The receiving device may transmit an indication of the sweeping pattern and the time slots to one or more of the neighboring transmitting devices. Subsequently, during one of the indicated time slots, the receiving device may perform a beam sweep to receive one or more RTS messages from one of the neighboring transmitting devices.

In an aspect of the disclosure, a method, a computer-readable medium, and an apparatus are provided. The apparatus may be configured to determine spatial directions of a plurality of wireless devices including a second wireless device and at least one other wireless device. The apparatus may be configured to select a sweeping pattern of the apparatus based on the determined spatial directions. The apparatus may be configured to transmit, to the second wireless device, information indicating the sweeping pattern of the apparatus and at least one time slot during which the apparatus will listen to transmissions from the second wireless device. The apparatus may be configured to perform, based on the determined spatial directions and the transmitted information, a beam sweep for receiving one or more RTS messages. The apparatus may perform the beam sweep by listening for an RTS message based on the selected sweeping pattern during the at least one time slot.

In another aspect of the disclosure, a method, computer-readable medium, and an apparatus are provided. The apparatus may be configured to receive, from a second wireless device, information indicating a sweeping pattern of the second wireless device and at least one time slot during which the second wireless device will listen to transmissions from the apparatus. The apparatus may be configured to transmit an RTS message, during the at least one time slot, to the second wireless device in at least one spatial direction based on the sweeping pattern.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
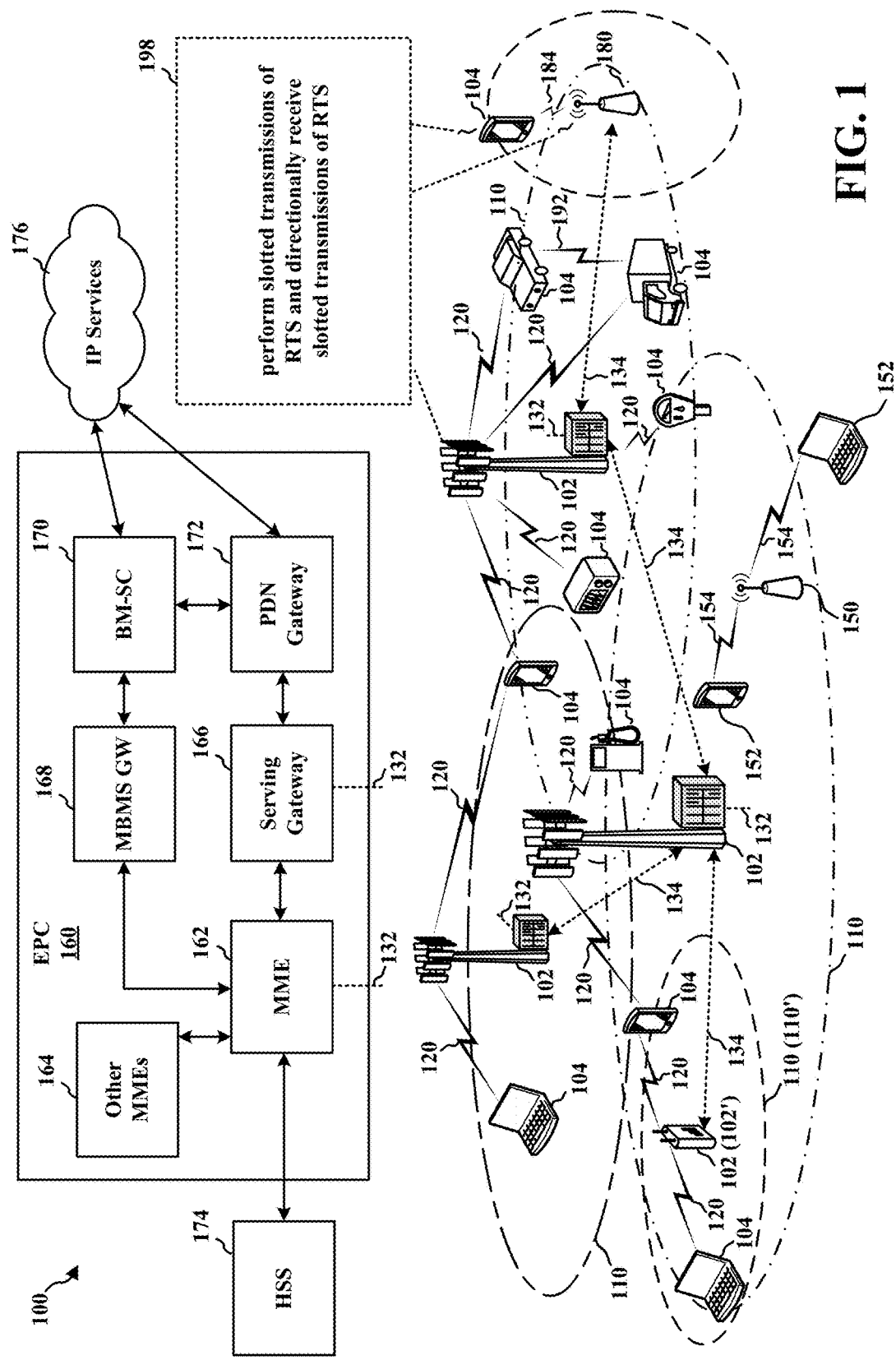
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a transmitting device (e.g., the UE 104, the base station 102, or the gNB 180) may be configured to perform slotted transmissions of RTS and a receiving device (e.g., the UE 104, the base station 102, or the gNB 180) may be configured to directionally receive slotted transmissions of RTS (198).

Figure 2:
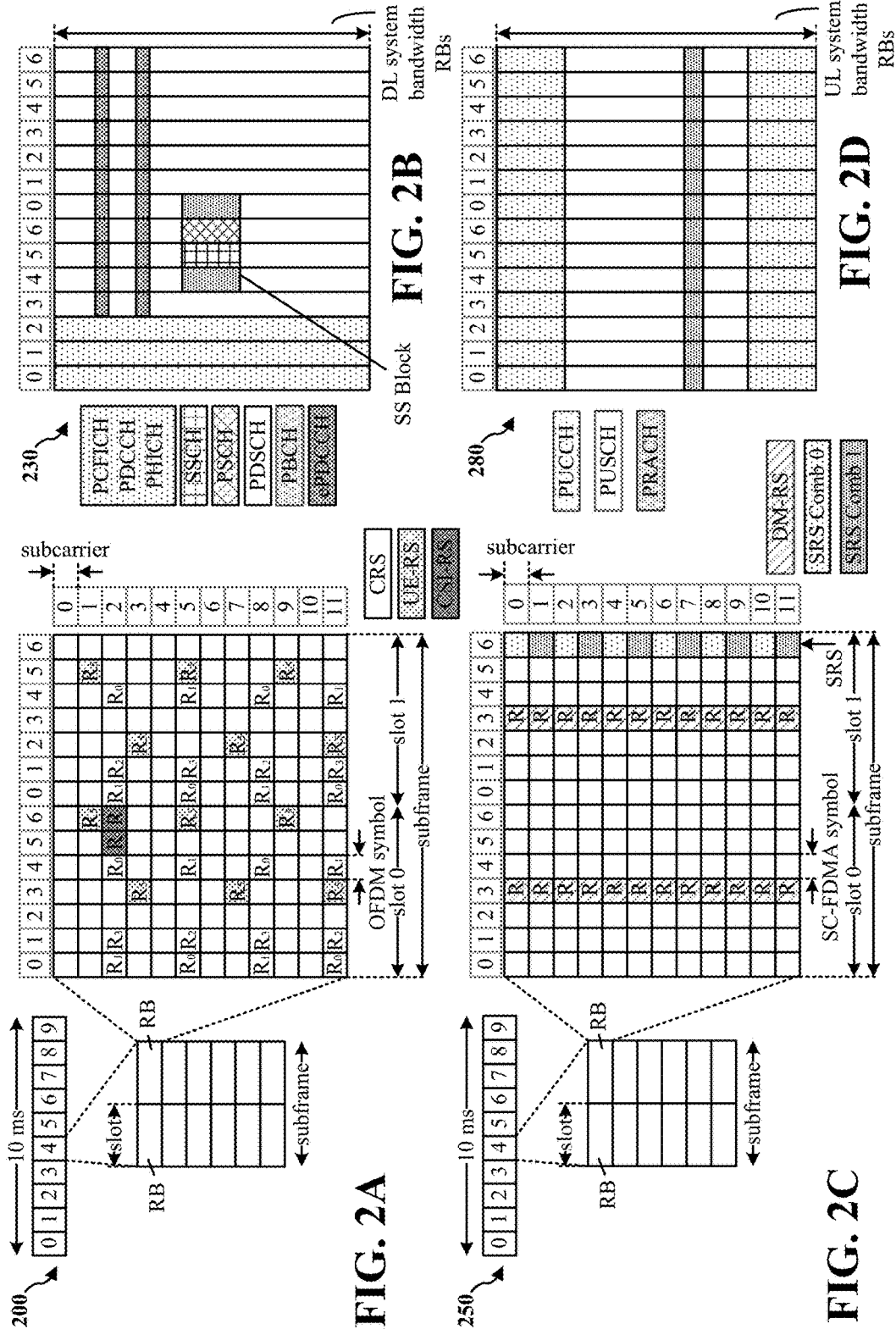
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common R5), UE-specific reference signals (UE-RS), and channel state information reference signals (CSI-RS). FIG. 2A illustrates CRS for antenna ports 0, 1, 2, and 3 (indicated as R0, R1, R2, and R3, respectively), UE-RS for antenna port 5 (indicated as R5), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
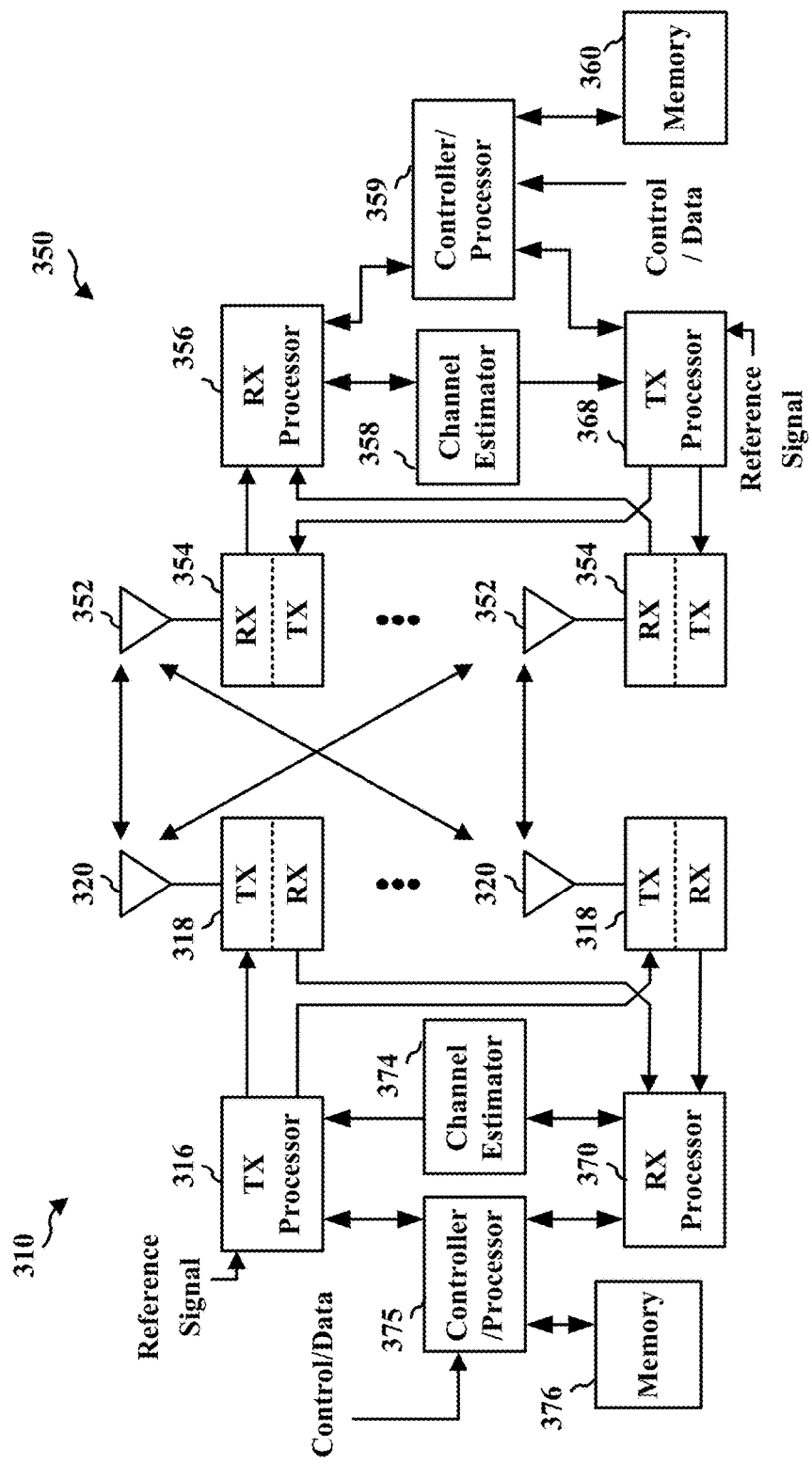
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
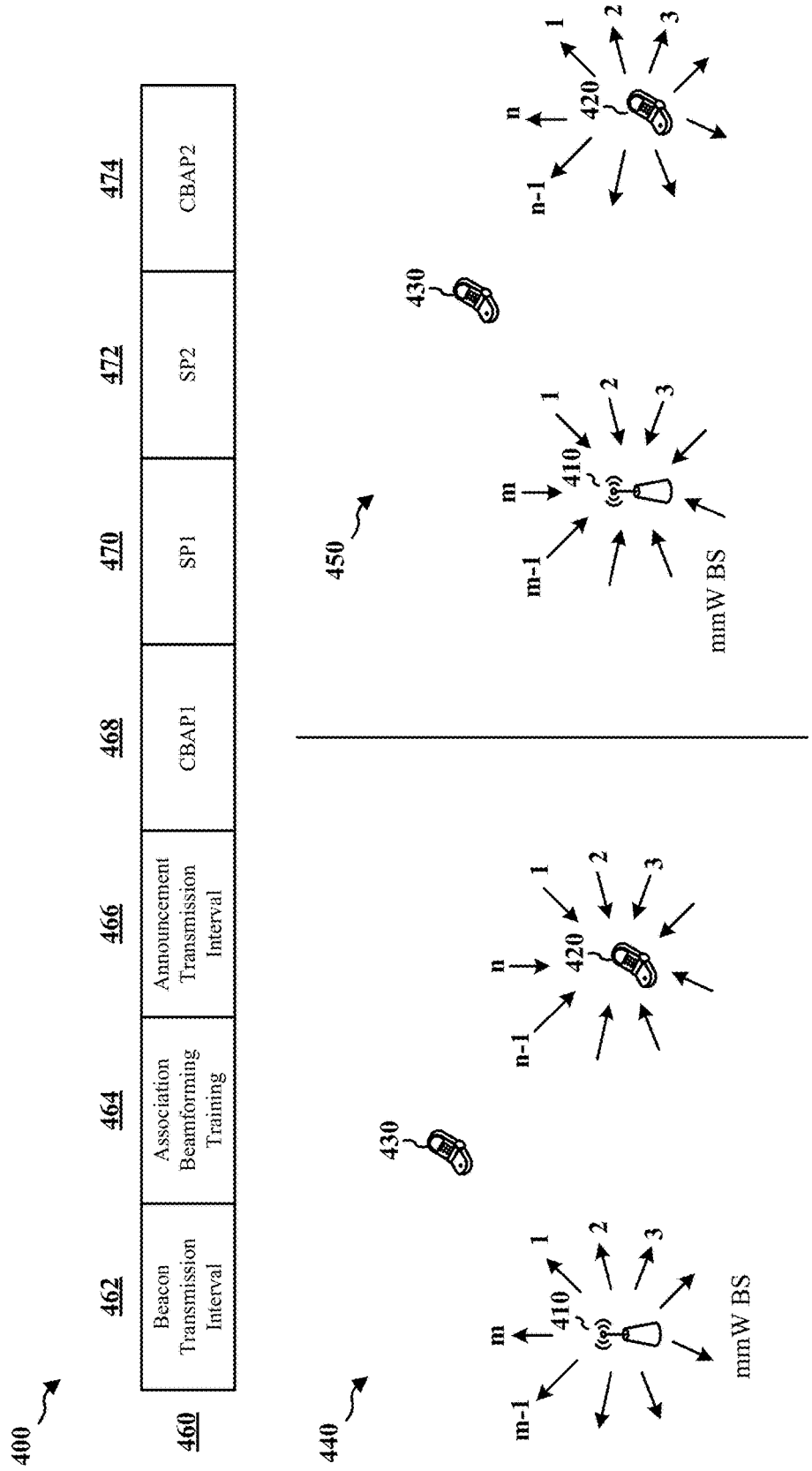
FIG. 4 illustrates a diagram of access periods within a beacon interval duration and diagrams of a mmW network.

FIG. 4 illustrates a diagram 400 of access periods within a beacon interval duration 460 and diagrams 440, 450 of a mmW network. As shown in FIG. 4, the beacon interval duration 460 may include a beacon transmission interval 462, an association beamforming training period 464, an announcement transmission interval, a first contention-based access period (CBAP1) 468, a first service period (SP1) 470, a second service period (SP2), 472, and a second contention-based access period (CBAP2) 474. Beacon transmission, beam training, and subsequent data transmissions may occur within the beacon interval duration 460. Referring to the diagram 440, the mmW network may include a mmW base station 410 and a number of UEs 420, 430. The mmW base station 410 may include hardware for performing analog and/or digital beamforming. If the mmW base station 410 is equipped with analog beamforming, at any one time, the mmW base station 410 may transmit or receive a signal in only one direction. If the mmW base station 410 is equipped with digital beamforming, the mmW base station 410 may concurrently transmit multiple signals in multiple directions or may receive multiple signals concurrently in multiple directions. Further, the UE 420, for example, may include hardware for performing analog and/or digital beamforming. If the UE 420 is equipped with analog beamforming, at any one time, the UE 420 may transmit or receive a signal in only one direction. If the UE 420 is equipped with digital beamforming, the UE 420 may concurrently transmit multiple signals in multiple directions or may concurrently receive multiple signals in multiple directions.

Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters (the super high frequency (SHF) band extends between 3 GHz and 30 GHz, also referred to as centimeter wave). While the disclosure herein refers to mmWs, it should be understood that the disclosure also applies to near mmWs. Further, while the disclosure herein refers to mmW base stations, it should be understood that the disclosure also applies to near mmW base stations.

In order to build a useful communication network in the millimeter wavelength spectrum, a beamforming technique may be used to compensate for path loss. Beamforming technique focuses the RF energy into a narrow direction to allow the RF beam to propagate farther in that direction. Using the beamforming technique, non-line of sight (NLOS) RF communication in the millimeter wavelength spectrum may rely on reflection and/or diffraction of the beams to reach the UE. If the direction becomes blocked, either because of UE movement or changes in the environment (e.g., obstacles, humidity, rain, etc.), the beam may not be able to reach the UE. Thus, in order to ensure that the UE has continuous, seamless coverage, multiple beams in as many different direction as possible may be available. In an aspect, the beamforming technique may require that the mmW base stations and the UEs transmit and receive in a direction that allows the most RF energy to be collected.

In the mmW network, UEs may perform beam sweeps with mmW base stations within range. The beam sweeps may be performed as illustrated in the diagram 440 and/or the diagram 450. Referring to the diagram 440, in a beam sweep, the mmW base station 410 may transmit m beams (or beacons) in a plurality of different spatial directions. In an aspect, the mmW base station 410 may transmit the beams/beacons during the beacon transmission interval 462. The UE 420 listens/scans for the beam transmissions from the mmW base station 410 in n different receive spatial directions. When listening/scanning for the beam transmissions, the UE 420 may listen/scan for the beam sweep transmission from the mmW base station 410 $m$ times in each of the n different receive spatial directions (a total of m*n scans). In an aspect, the listening/scanning may occur during the association beamforming training period 464. Alternatively, when listening/scanning for the beam transmissions with digital beamforming, the UE 420 may listen/scan for each beam direction of the m beam directions, and apply different weights (phase and/or amplitude changes) to determine a received signal for n different receive directions of the m transmissions (a total of m scans).

In another configuration, referring to the diagram 450, in a beam sweep, the UE 420 may transmit n beams in a plurality of different spatial directions. The mmW base station 410 listens/scans for the beam transmissions from the UE 420 in m different receive spatial directions. When listening/scanning for the beam transmissions, the mmW base station 410 may listen/scan for the beam sweep transmission from the UE 420 $n$ times in each of the m different receive spatial directions (a total of m*n scans). Alternatively, when listening/scanning for the beam transmissions with digital beamforming, the mmW base station 410 may listen/scan for each beam direction of the n beam directions, and apply different weights (phase and/or amplitude changes) to determine a received signal for m different receive directions of the n transmissions (a total of n scans).

Based on the performed beam sweeps, the UEs and/or the mmW base stations determine a channel quality associated with the performed beam sweeps. For example, if the beam sweep process in diagram 440 is performed, the UE 420 may determine the channel quality associated with the performed beam sweeps. However, if the beam sweep process in the diagram 450 is performed, the mmW base station 410 may determine the channel quality associated with the performed beam sweeps. If the UE 420 determines a channel quality associated with the performed beam sweeps, the UE 420 may send the channel quality information (also referred to as beam sweep result information) to the mmW base station 410. If the mmW base station 410 determines a channel quality associated with the performed beam sweeps, the mmW base station 410 may send the beam sweep result information to UE 420.

In an aspect, the channel quality may be affected by a variety of factors. The factors include movement of the UE 420 along a path or due to rotation (e.g., a user holding and rotating the UE 420), movement along a path behind obstacles or within particular environmental conditions (e.g., obstacles, rain, humidity). The UE 420 and the mmW base station 410 may also exchange other information, such as configuration information, for beamforming (e.g., analog or digital beamforming capabilities, beamforming type, timing information, etc.)

Referring to the beacon interval duration 460, during an announcement transmission interval 466, the mmW base station 410 may indicate which stations will receive which service period (SP), such as SP1 470 or SP2 472. Within an SP, UEs may communicate in pre-allocated or dynamically allocated slots, and contention is not needed. During the announcement transmission interval 466, the mmW base station 410 may indicate a timing window of a contention based access period (CBAP). During a CBAP, such as CBAP1 468 and CBAP2 474, UEs may contend for channel access using an RTS/CTS message exchange. In such an exchange, a first wireless device (e.g., a UE) with data to transmit to a second wireless device may first transmit an RTS message. The RTS message may include a frame control field, a duration field, a receiver address, a transmitter address, and a frame check sequence (FCS). Upon receiving the RTS message, the second wireless device may determine if the channel is clear or otherwise available for transmission. If so, then the second wireless device may transmit a CTS message. The CTS message may include a frame control field, a duration field, a receiver address, and a frame check sequence (FCS).

Although FIG. 4 shows beam training between the mmW base station 410 and UE 420, the methods, techniques, and protocols described may be implemented between any device (e.g., between two UEs, between a UE and an access point). For example, the mmW base station 410 may be an access point.

Figure 5:
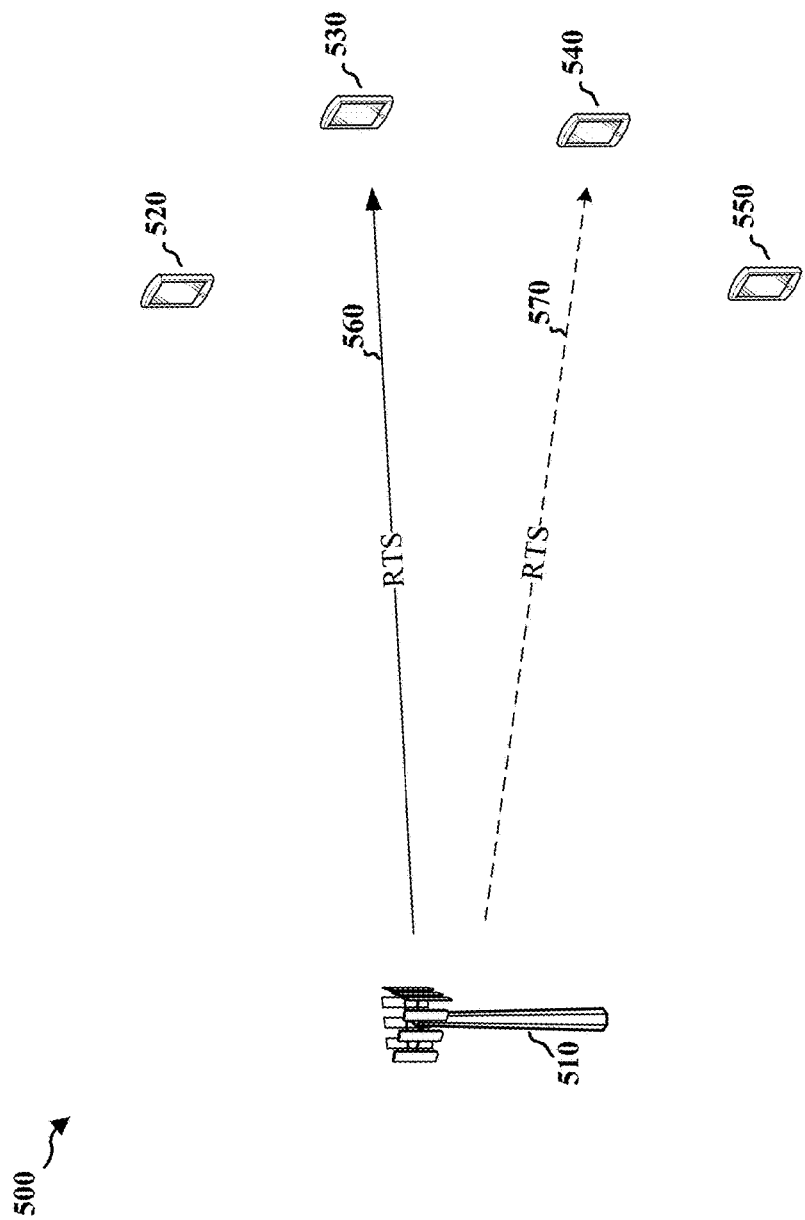
FIG. 5 is a diagram of a wireless communication system using a contention based access period for downlink transmissions.

FIG. 5 is a diagram 500 of a wireless communication system using a contention based access period for downlink transmissions. The wireless communication system may be compatible with the IEEE 802.11ad standard and/or other standards. Referring to FIG. 5, a base station 510 may transmit an RTS message to one of the UEs 520, 530, 540, 550. For example, the base station 510 may transmit a first RTS message 560 to the UE 530. Although the base station 510 may know which direction the base station 510 intends to transmit the first RTS message 560, the UE 530 may receive transmissions using a omni-directional beam, and the UE 530 may not know which wireless device (e.g., the base station 510 or other UEs) will transmit an RTS. Upon receiving the first RTS message 560, the UE 530 may estimate the interference at the UE 530 and/or determine channel conditions. If the medium is busy, or interference at the UE 530 is high (e.g., the UE 530 may overestimate the interference), the UE 530 may not respond with a CTS message to the base station 510. If the base station 510 does not receive the CTS message from the base station 510, then the base station may send a second RTS message 570 to the UE 540. Each round of RTS and CTS messages may lead to additional network overhead.

Figure 6:
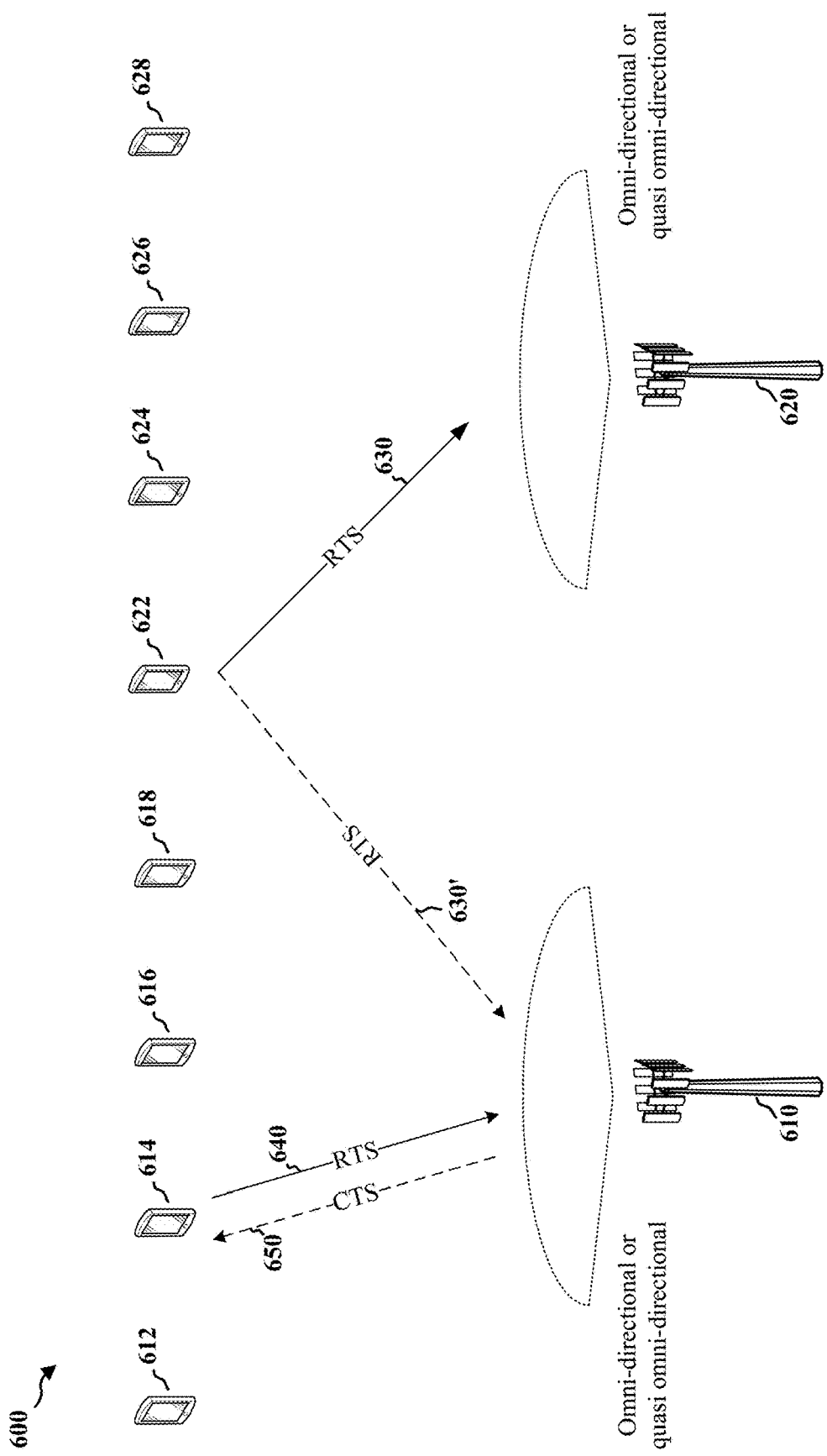
FIG. 6 is a diagram of a wireless communication system using an uplink contention based access period for uplink transmissions.

FIG. 6 is a diagram 600 of a wireless communication system using an uplink contention based access period for uplink transmissions. The wireless communication system may be compatible with the IEEE 802.11ad standard and/or other standards. Referring to FIG. 6, a first base station 610 may be associated with UEs 612, 614, 616, 618. A second base station 620 may be associated with UEs 622, 624, 626, 628. The first and second base stations 610, 620 may be operating in an omni-directional mode or quasi omni-directional mode with respect to receiving signals, such as RTS signals, from UEs during a contention based access period. During this period, many UEs may attempt to transmit RTS messages to a single base station and the number of antennas at each UE may be smaller than the number of antennas at the base station.

Referring to FIG. 6, the UE 622 may transmit a first RTS message 630 to the second base station 620. The UE 614 may transmit a second RTS message 640 to the first base station 610. In an aspect, the UE 622 may be sufficiently close to the first base station 610. Because the first base station 610 may be receiving in an omni-directional manner, the first RTS message 630 may be received as interference (the RTS message 630') at the first base station 610. Without further coordination of RTS transmission, the UE 622 may cause interference at the first base station 610 during the RTS transmission of the UE 614. If the interference to noise ratio exceeds a threshold (e.g., 3 dB), then the first base station 610 may not transmit a CTS message 650 to the UE 614. Without the CTS message 650, the UE 614 may not obtain access to the medium during the contention based period. Other UEs associated with the first base station 610 may experience similar problems, which may increase RTS/CTS overhead.

Figure 7:
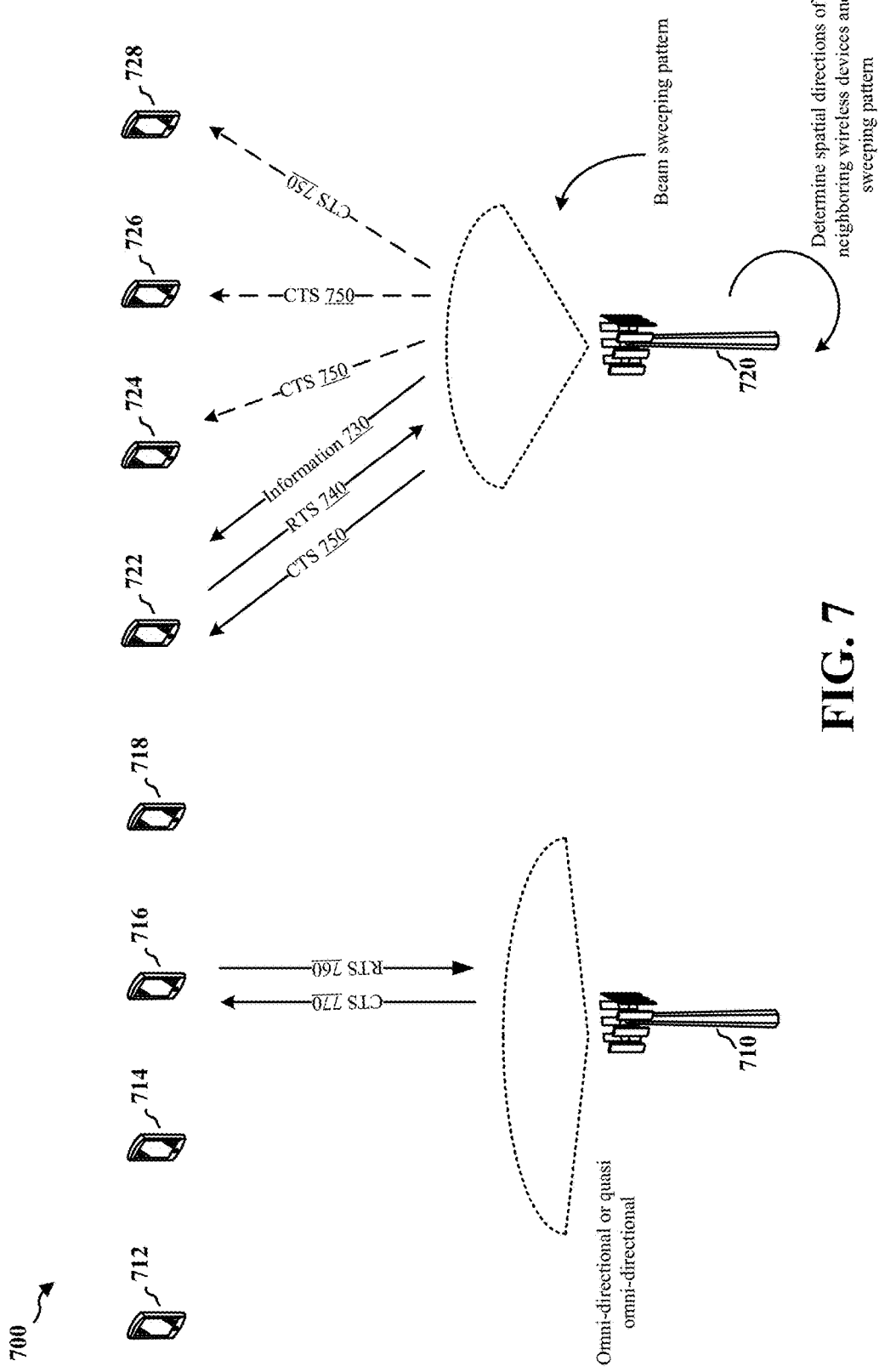
FIG. 7 is a diagram of a method slotted transmission and directional reception of RTS in a wireless communication system.

FIG. 7 is a diagram 700 of a method slotted transmission and directional reception of RTS in a wireless communication system. The wireless communication system may be compatible with the IEEE 802.11ad standard and/or other standards. Referring to FIG. 7, a first base station 710 may be associated with UEs 712, 714, 716, 718. A second base station 720 may be associated with UEs 722, 724, 726, 728. The first base stations may 710 may be operating in an omni-directional mode or quasi omni-directional mode with respect to receiving signals, such as RTS signals, from UEs during a contention based access period. The second base station 720 may be capable of operating in an omni-directional mode or in a directional mode for receiving signals during a contention based access period.

Because the UEs 722, 724, 726, 728 are associated with, or otherwise connected to, the second base station 720, the second base station 720 may know the number of UEs that could potentially transmit an RTS message to the second base station 720. Accordingly, the second base station 720 may perform beam training, as described in FIG. 4, with each the UEs 722, 724, 726, 728 and allocate time slots for RTS transmission for each of the UEs 722, 724, 726, 728 based on the number of UEs.

In one example, if there are 4 UEs, then the second base station 720 may allocate 4 separate time slots, one for each UE. Alternatively, the second base station 720 may allocate 4 separate time slots, but allocate 1 time slot to UE 722, 1 time slot to UE 724, 2 time slots to UE 726, and no time slots to UE 728. In this alternative, the second base station 720 may reduce potential interference and also enable UE 726 to have a greater chance of obtaining access to the medium if the UE 726 has been previously denied medium access. In another aspect, the second base station 720 may further allocate the time slots based on channel conditions. For example, the second base station 720 may not allocate a time slot when the channel is expected to be busy.

Through beam training, the second base station 720 may determine optimal or preferred spatial directions for each of the UEs 722, 724, 726, 728. After determining the spatial directions, the second base station 720 may select a sweeping pattern for receiving signals from each UE based on the optimal spatial directions for each UE. For example, the UE 722 may have 4 antennas of which 3 antennas may be used for transmission to 3 corresponding antennas at the second base station 720. Based on the spatial directions, the second base station 720 may select a sweeping pattern corresponding to one or more angular sectors or regions for receiving RTS signals from the UE 722.

After selecting the sweeping pattern and allocating a time slot to the UE 722, the second base station 720 may transmit information 730 to the UE 722 that indicates the sweeping pattern (e.g., 20 degrees to 160 degrees) and at least one allocated time slot (e.g., time period X) during which the second base station 720 will listen for RTS transmissions from the UE 722. In an aspect, the second base station 720 may use a seed (or one or more bits) to indicate a sweeping pattern configuration. For example, a seed of '00' may indicate a sweeping pattern of 20 degrees to 90 degrees, a seed of '01' may indicate a sweeping pattern of 90 degrees to 180 degrees, a seed of '10' may indicate a sweeping pattern of 180 degrees to 270 degrees, and a seed of '11' may indicate a sweeping pattern of 270 degrees to 340 degrees. In one configuration, the second base station 720 may transmit the information 730 during the announcement transmission interval 466 as indicated in FIG. 4. In another configuration, the second base station 720 may transmit the information in a PDCCH. In this configuration, the second base station 720 may reserve and utilize a set of bits within the downlink control information of the PDCCH to transmit the information 730. In yet another configuration, the second base station 720 may transmit the information 730 via RRC signaling.

The UE 722 may receive the information 730. When the UE 722 has data to transmit to the second base station 720, the UE 722 may transmit an RTS message 740 during the allocated time slot indicated in the information 730. The UE 722 may also select one or more antennas to directionally transmit the RTS message 740 via beamforming to the second base station 720. The one or more antennas may be selected based on the sweeping pattern indicated by the second base station 720. The UE 722 may select one or more spatial directions to transmit the RTS message 740 based on the sweeping pattern indicated by the second base station 720.

During the time slot indicated in the information 730, the second base station 720 may perform a beam sweep over just the angular range indicated by the beam sweep pattern and listen for messages from the UE 722. The second base station 720 may receive the RTS message 740. After receiving the RTS message 740, the second base station 720 may assess the channel to evaluate whether the channel is available for data transmission. If the channel is busy or there is too much interference at the second base station 720, then the second base station 720 may not transmit a CTS message 750. Assuming the channel is free, the second base station 720 may determine to transmit the CTS message 750 to the UE 722. In one aspect, the second base station 720 may transmit the CTS message 750 omni-directionally, and the CTS message 750 may be received not only by the UE 722, but also by nearby devices such as the UEs 724, 726, 728, in order to reserve the medium for the UE 722. In another aspect, the second base station 720 may transmit the CTS message 750 directionally via beamforming. In this aspect, the second base station 720 may determine a first spatial direction at which the UE 722 transmitted the RTS message 740 and transmit the CTS message 750 in the same first spatial direction to the UE 722. The CTS message 750 may indicate that the UE 722 may begin the data transmission.

The RTS message 740 may include a duration field. In one configuration, the duration field may indicate the duration of the RTS message 740. In this configuration, the CTS message 750 may be transmitted after the expiration of the duration field in the RTS message 740. For example, the second base station 720, upon receiving the RTS message 740, may set a network allocation vector (NAV) based on the duration field of the RTS message 740, and transmit the CTS message 750 after the NAV counts down to zero. In another configuration, the duration field in the RTS message 740 may indicate and reserve a time period after the RTS message 740 that includes a duration of CTS message 750, a data message, an acknowledgment message, and any interframe space in between messages. In this configuration, the CTS message 750 may be transmitted during and before the end of the duration indicated in the RTS message 740. For example, the second base station 720, upon receiving the RTS message 740, may determine a NAV based on the duration field of the RTS message 740. Because the second base station 720 is the intended recipient of the RTS message 740, however, the second base station 720 may not set the NAV according to the duration field, and may transmit the CTS message 750.

The CTS message 750 may include a duration field. In one configuration, the duration field in the CTS message 750 may indicate the duration of the CTS message 750. For example, in this configuration, the UE 722 may receive the CTS message 750 and set the NAV according to the duration of the CTS message 750. After the NAV expires (counts down to 0), then the UE 722 may transmit the data. In another configuration, the duration field may indicate and reserve a time period after the CTS message 750 that includes a duration of a data message, an acknowledgment message, and any interframe space in between messages. For example, in this configuration, the UE 722 may receive the CTS message 750 and may not set the NAV according to the CTS message 750. The UE 722 may send the data transmission before the expiration of the time period indicated in the duration field of the CTS message 750.

As previously discussed, the second base station 720 may transmit the CTS message 750 directionally to neighboring devices (e.g., the UEs 724, 726, 728). Alternatively, the second base station 720 may transmit information indicating that the CTS message 750 has been transmitted to the UE 722. In an aspect, the information may be transmitted to the other UEs omni-directionally or via beamforming. When the UEs 724, 726, 728 receive either the CTS message 750 or the information, the UEs 724, 726, 728 will determine that the medium is currently being used. The UEs 724, 726, 728 may each set the NAV based on the duration field and may not attempt to transmit an RTS message until the medium is available (e.g., when NAV is equal to 0), which reduces interference and RTS/CTS overhead.

Upon receiving the CTS message 750, the UE 722 may transmit the data to the second base station 720. After receiving the data, the second base station 720 may transmit an acknowledgment message to the UE 722.

Because the UE 722 transmitted the RTS message 740 directionally to the second base station 720, the UE 722 did not interference with a second RTS message 760 transmitted by the UE 716. The first base station 710 was able to successfully receive the second RTS message 760 and determine that the channel was available for data transmission. As such, by resolving omni-directional reception during the RTS stage, the second base station 720 may enable the first base station 710 to transmit a second CTS message 770 to the UE 716, thereby increasing and improving medium reuse as compared to the scenario described in FIG. 6. Although FIG. 7 illustrates that the first base station 710 is operating in an omni-directional mode, the first base station 710 may also operate in a directional mode for signal reception and transmission.

In the aforementioned example, the second base station 720 functioned as a receiver device, directionally receiving the RTS message 740, and the UE 722 functioned as a transmitter device, directionally transmitting the RTS message 740. However, any device may function as the receiver device and/or the transmitter device. For example, a base station, an access point, a relay, a UE, or a CPE may be a transmitter device. Similarly, a base station, an access point, a relay, a UE, or a customer premises equipment (CPE) may be a receiver device. Accordingly, the methods, principles, and techniques described herein may be applicable to different types of devices and different configurations.

Figure 8:
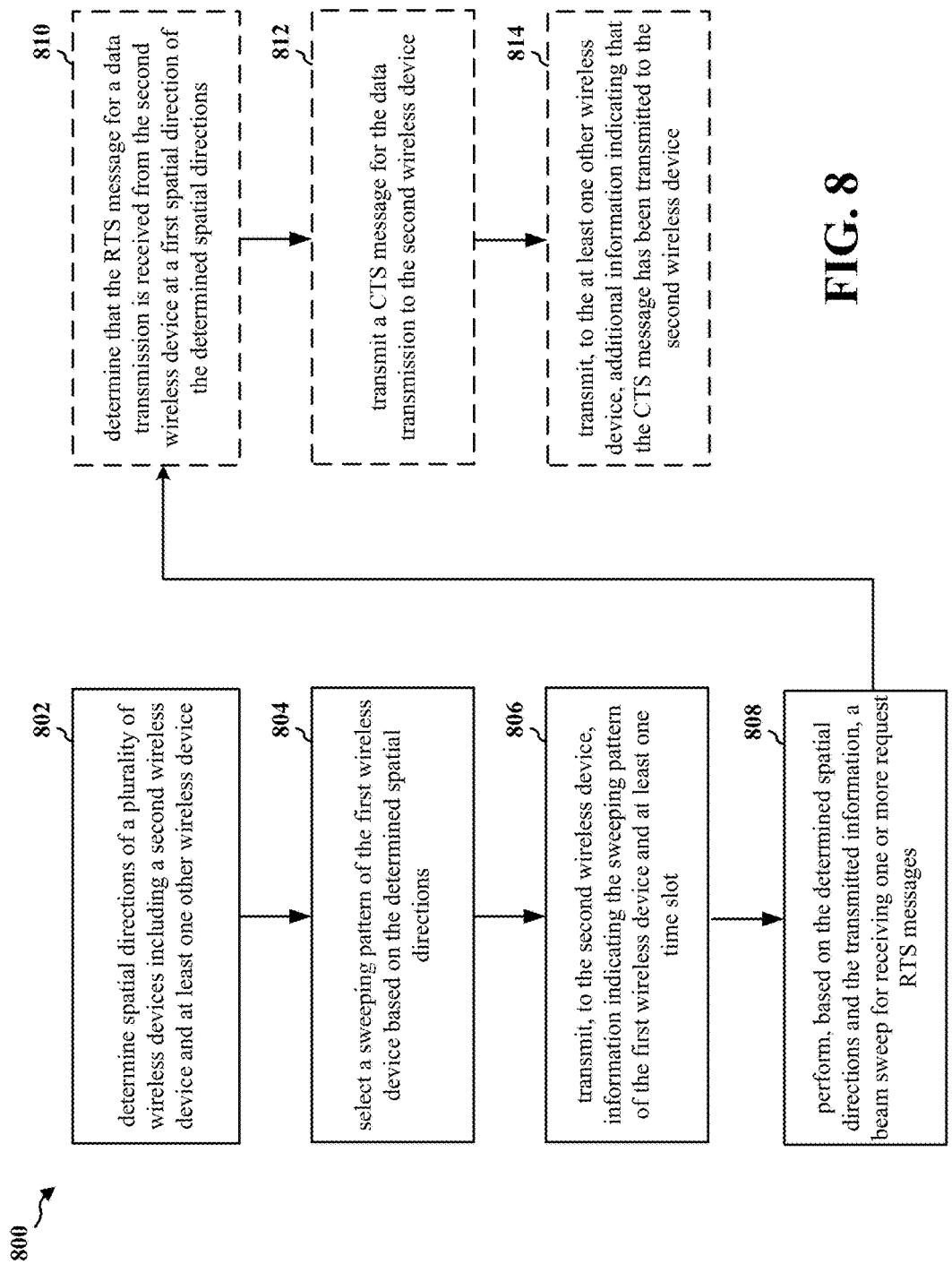
FIG. 8 is a flowchart of a method of wireless communication.

FIG. 8 is a flowchart 800 of a method of wireless communication. The method may be performed by an apparatus (e.g., the second base station 720, the UE 722, the apparatus 1002/1002'). At 802, the apparatus may determine spatial directions of a number of wireless devices including a second wireless device and at least one other wireless device. For example, referring to FIG. 7, the apparatus may be the second base station 720. The second base station may determine spatial directions of a number of UEs including UE 722 (the second wireless device) and UEs 724, 726, 728 (at least one other wireless device). The second base station 720 may determine the spatial directions by performing beam training. For example, the UE 722 may transmit beacons from each of its antennas, the second base station 720 may receive the beacons and determine which antenna provides the best quality signal at the second base station 720 (e.g., highest SNR or SINR). The second base station 720 may transmit the information indicating the best antenna at the UE 722 to the UE 722.

At 804, the apparatus may select, after beam training, a sweeping pattern of the apparatus based on the determined spatial directions. For example, referring to FIG. 7, the second base station 720 may select the sweeping pattern of the second base station 720 for receiving RTS transmission from the UE 722, for example. The second base station 720 may select the sweeping pattern by identifying one or more antennas that are optimal for receiving transmissions from the UE 722. Based on the location and the beam width of the one or more antennas, the second base station 720 may determine an angular region within which the second base station 720 may receive signals from the UE 722 (e.g., 20 degrees to 160 degrees). The second base station 720 may also allocate a time slot for the UE 722 to transmit the RTS message 740. The second base station 720 may allocate the time slot by determining the total number of potential transmitters, which may be 4 in FIG. 7, allocating 4 time slots, and reserving a single time slot for the UE 722. In another aspect, the time slots may further be allocated based on whether a UE has transmit priority among other UEs.

At 806, the apparatus may transmit, to the second wireless device, information indicating the sweeping pattern of the apparatus and at least one time slot. For example, referring to FIG. 7, the second base station 720 may transmit the information 730 indicating the sweeping pattern of the second base station 720 and the at least one time slot allocated to the UE 722 for directional RTS transmission.

At 808, the apparatus may perform, based on the determined spatial directions and the transmitted information, a beam sweep for receiving one or more RTS messages. For example, referring to FIG. 7, the second base station 720 may perform a beam sweep for receiving the RTS message 740 based on the information 730. The second base station 720 may perform by the beam sweep by listening for the RTS message 740 at the allocated time for the UE 722. The second base station 720 may also assign different weights to each on the antennas at the second base station 720 based on the determined spatial directions and the sweep pattern.

At 810, the apparatus may determine that the RTS message for a data transmission is received from the second wireless device at a first spatial direction of the determined spatial directions. For example, referring to FIG. 7, the second base station 720 may determine that the RTS message 740 for a data transmission is received from the UE 722 at a first spatial direction by receiving the RTS message 740 and identifying the direction from which the RTS message 740 was received with a highest signal quality.

At 812, the apparatus may transmit a CTS message to authorize the data transmission from the second wireless device. In an aspect, the CTS message may be transmitted in a beamformed manner in the first spatial direction or transmitted in an omni-directional manner. For example, referring to FIG. 7, the second base station 720 may transmit the CTS message 750 to the UE 722 in a beamformed manner in the first spatial direction.

At 814, the apparatus may transmit, to the at least one other wireless device, additional information indicating that the CTS message has been transmitted to the second wireless device. For example, referring to FIG. 7, the second base station 720 may also transmit the CTS message 750 to the UEs 724, 726, 728. The CTS message 750 to the UEs may be transmitted directionally or omni-directionally.

In another configuration, the apparatus may set the NAV based on the duration field of the RTS message, and the CTS message may be beamformed to the second wireless device after the NAV has expired. For example, the second base station 720 may set the NAV based on the duration field of the RTS message 740, and transmit the CTS message 750 to the UE 722 after the NAV has expired. In this configuration, the duration may indicate the duration of the RTS message.

Figure 9:
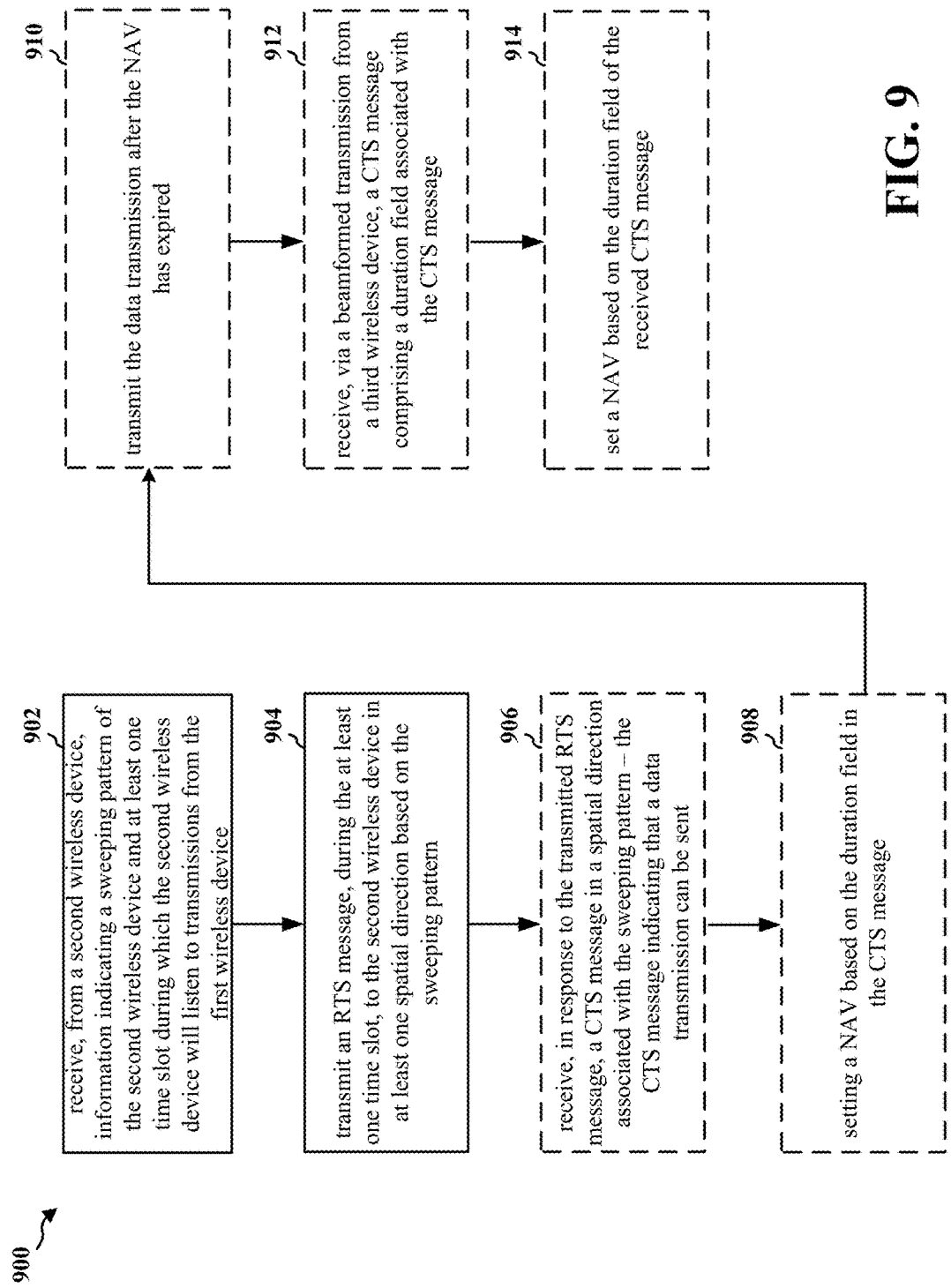
FIG. 9 is a flowchart of a method of wireless communication.

FIG. 9 is a flowchart 900 of a method of wireless communication. The method may be performed by an apparatus (e.g., the UE 722, the second base station 720, the apparatus 1202/1202'). At 902, the apparatus may receive, from a second wireless device, information indicating a sweeping pattern of the second wireless device and at least one time slot during which the second wireless device will listen to transmissions from the first wireless device. For example, referring to FIG. 7, the apparatus may be the UE 722, and the second wireless device may be the second base station 720. The UE 722 may receive, from the second base station 720, the information 730 that indicates a sweeping pattern of the second base station 720 and at least one allocated time slot during which the second base station 720 will listen to RTS transmissions from the UE 722.

At 904, the apparatus may transmit an RTS message, during the at least one time slot, to the second wireless device in at least one spatial direction based on the sweeping pattern. For example, referring to FIG. 7, the UE 722 may transmit the RTS message 740, during a time slot of the 4 allocated time slots, to the second base station 720 in at least one spatial direction based on the sweeping pattern of the second base station 720.

At 906, the apparatus may receive, in response to the transmitted RTS message, a CTS message in a spatial direction associated with the sweeping pattern. The CTS message may indicate that a data transmission can be sent. For example, referring to FIG. 7, the UE 722 may receive, in response to the RTS message 740, the CTS message 750. The CTS message 750 may be received in a spatial direction associated with the sweeping pattern of the second base station 720. For example, the CTS message 750 may be received in the same spatial direction in which the RTS message 740 was transmitted.

At 908, the apparatus may set a NAV based on the duration field in the CTS message. In one example, referring to FIG. 7, the UE 722 may set the NAV based on the duration field indicated in the CTS message 750. That is, the UE 722 may make the NAV value equal to the value of the duration in the duration field.

At 910, the apparatus may transmit the data after the NAV has expired. For example, referring to FIG. 7, the UE 722 may transmit the data after the NAV has expired if the NAV is set to the duration of the CTS message 750. In another example, if the duration indicates a length of time for transmitting the data and receiving an ACK, the UE 722 may transmit the data before the duration expires. In this configuration, the UE 722 may not set the NAV.

At 912, the apparatus may receive, via a beamformed transmission from a third wireless device, a CTS message comprising a duration field associated with the CTS message. For example, referring to FIG. 7, the apparatus may be the UE 724. The UE 724 may receive, via a beamformed transmission from the second base station 720, the CTS message 750.

At 914, the apparatus may set a NAV based on the duration field of the received CTS message. For example, referring to FIG. 7, the apparatus may be the UE 724, and the UE 724 may set the NAV based on the duration field of the CTS message 750. Accordingly, the UE 724 may not transmit RTS until the NAV has expired.

Figure 10:
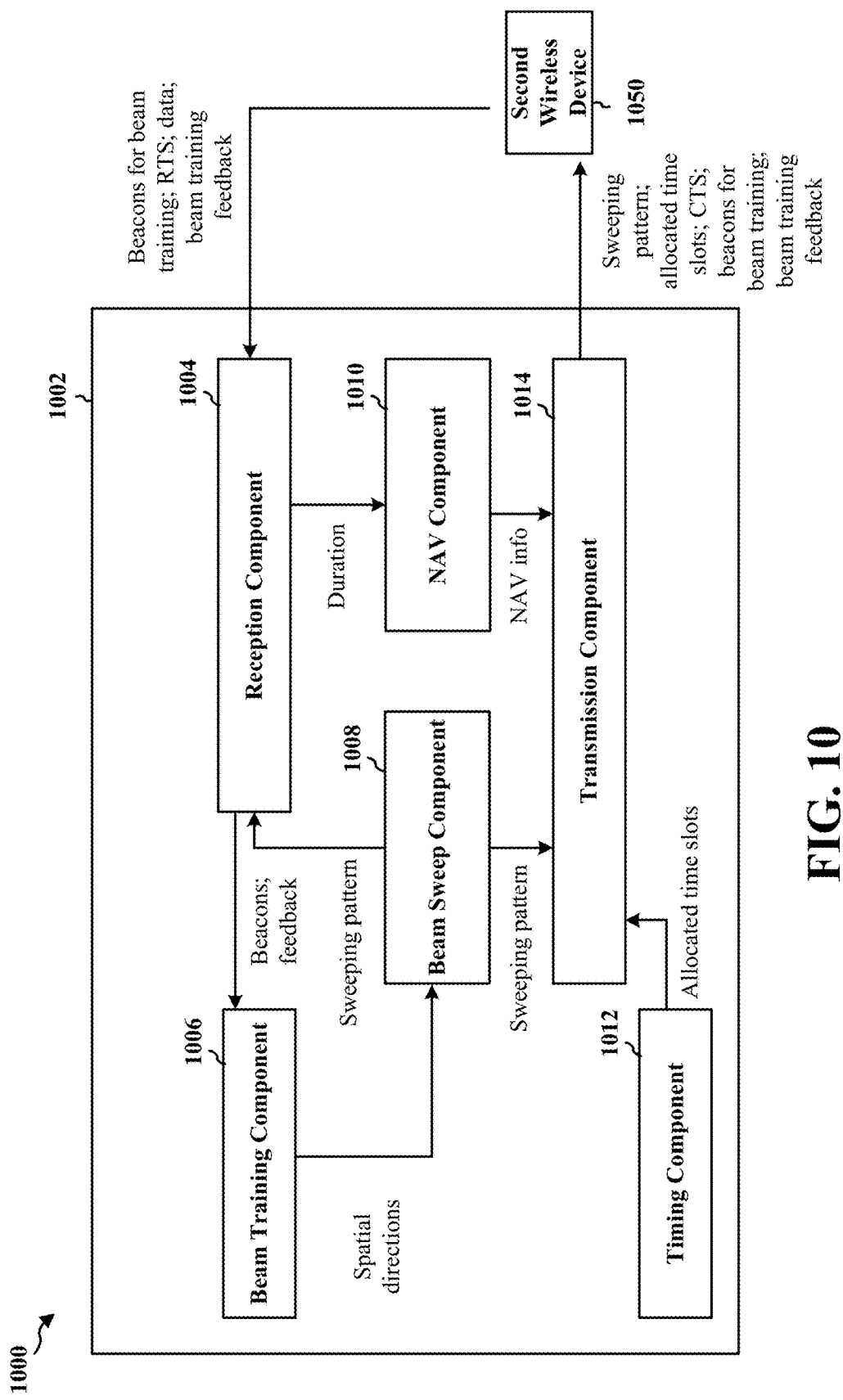
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE, a base station, or another device (e.g., the UE 722 or the second base station 720). The apparatus may include a reception component 1004, a beam training component 1006, a beam sweep component 1008, a NAV component 1010, a timing component 1012, and a transmission component 1014. The beam training component 1006 may be configured to determine spatial directions of a plurality of wireless devices including a second wireless device and at least one other wireless device. The beam sweep component 1008 may be configured to select a sweeping pattern of the apparatus based on the determined spatial directions. The transmission component 1014 may be configured to transmit, to the second wireless device, information indicating the sweeping pattern of the apparatus and at least one time slot during which the apparatus will listen to transmissions from the second wireless device. The beam sweep component 1008 and/or the reception component 1004 may be configured to perform, based on the determined spatial directions and the transmitted information, a beam sweep for receiving one or more RTS messages. The beam sweep component 1008 and/or the reception component 1004 may be configured to perform the beam sweep by listening for an RTS message based on the selected sweeping pattern during the at least one time slot. In one configuration, the reception component 1004 may be configured to determine that the RTS message for a data transmission is received from the second wireless device at a first spatial direction of the determined spatial directions. In this configuration, the transmission component 1014 may be configured to transmit a CTS message for the data transmission to the second wireless device. In an aspect, the CTS message may be transmitted in a beamformed manner in the first spatial direction. In another aspect, the CTS is transmitted in an omni-directional manner. In another configuration, the transmission component 1014 may be configured to transmit, to the at least one other wireless device, additional information indicating that the CTS message has been transmitted to the second wireless device. The additional information may be beamformed to each wireless device of the at least one other wireless device in each of the determined spatial directions other than the first spatial direction. In another aspect, the additional information may include a duration associated with the CTS message. In another configuration, the RTS message may include a duration field, and the NAV component 1010 may be configured to set a NAV based on the duration field in the RTS message. In this configuration, the CTS message may be beamformed to the second wireless device after the NAV has expired. In another aspect, the duration field may indicate the duration of the RTS message. In another configuration, a NAV may be transmitted in the CTS message via beamforming, and the reception component 1004 may be configured to receive the data transmission based on the NAV included with the CTS message. In another aspect, the NAV may indicate the duration of the CTS message. In another aspect, the apparatus may be one of a base station, an access point, a relay, a UE, or a CPE. In another aspect, the second wireless device may be one of a base station, an access point, a relay, a UE, or a CPE. In another aspect, the information may be transmitted during an announcement transmission interval. In another aspect, the information may be transmitted via a PDCCH. In another aspect, a set of bits may be reserved within the DCI of the PDCCH to indicate the information. In another aspect, the information may be transmitted via RRC signaling.

The apparatus may include additional components that perform each of the blocks of the algorithm in the aforementioned flowcharts of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
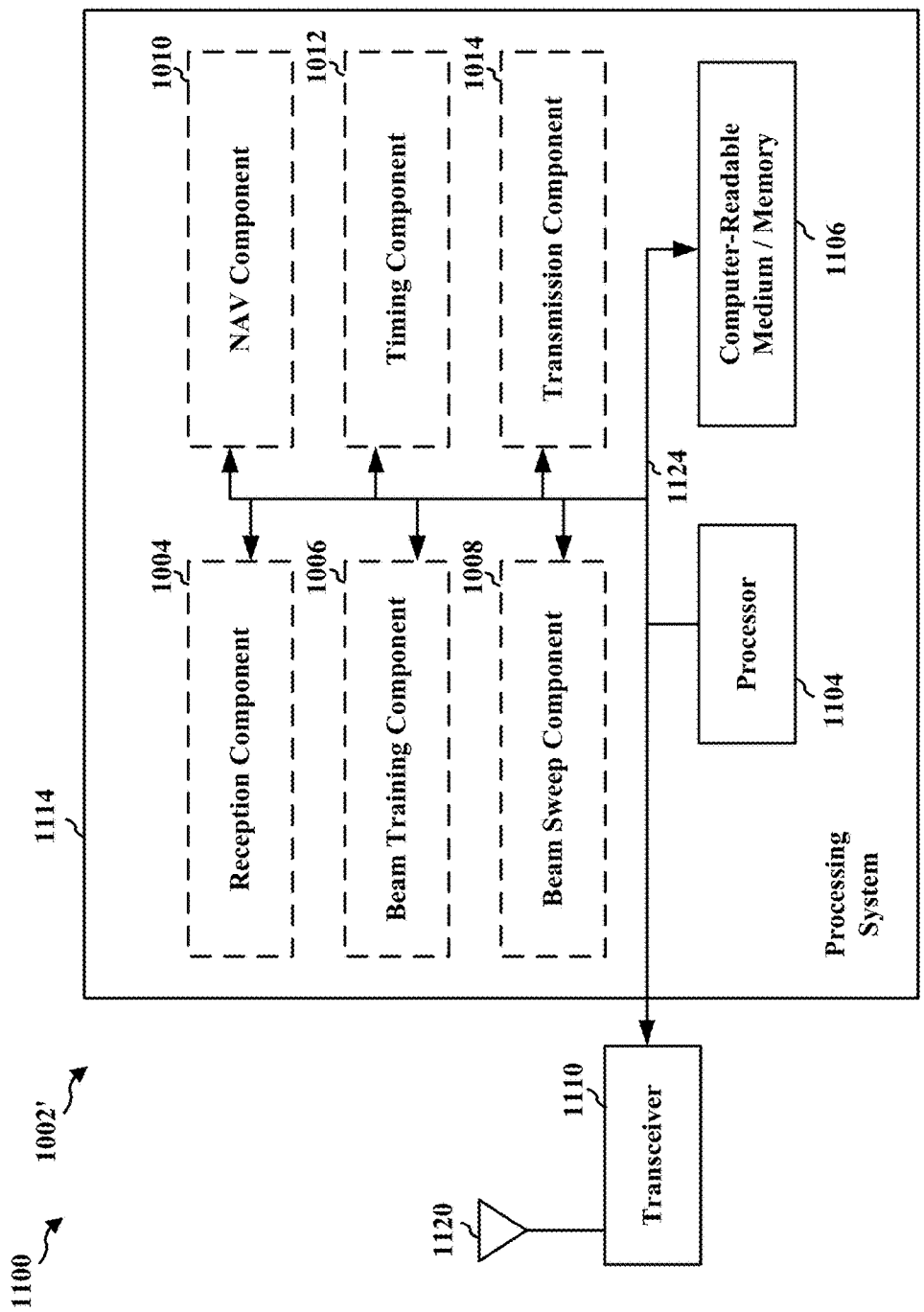
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1014, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014. The components may be software components running in the processor 1104, resident/stored in the computer readable medium/memory 1106, one or more hardware components coupled to the processor 1104, or some combination thereof. In one configuration, the processing system 1114 may be a component of the base station 310 and may include the memory 376 and/or at least one of the TX processor 316, the RX processor 370, and the controller/processor 375. In another configuration, the processing system 1114 may be a component of the UE 350 and may include the memory 360 and/or at least one of the TX processor 368, the RX processor 356, and the controller/processor 359.

In one configuration, the apparatus 1002/1002' for wireless communication includes means for determining spatial directions of a plurality of wireless devices including a second wireless device and at least one other wireless device, means for selecting a sweeping pattern of the apparatus based on the determined spatial directions, means for transmitting, to the second wireless device, information indicating the sweeping pattern of the apparatus and at least one time slot during which the apparatus will listen to transmissions from the second wireless device, and means for performing, based on the determined spatial directions and the transmitted information, a beam sweep for receiving one or more RTS messages. The means for performing the beam sweep may be configured to listen for an RTS message based on the selected sweeping pattern during the at least one time slot. In one configuration, the apparatus may include means for determining that the RTS message for a data transmission is received from the second wireless device at a first spatial direction of the determined spatial directions. In this configuration, the apparatus may include means for transmitting a CTS message for the data transmission to the second wireless device. In an aspect, the CTS message may be transmitted in a beamformed manner in the first spatial direction. In another aspect, the CTS is transmitted in an omni-directional manner. In another configuration, the apparatus may include means for transmitting, to the at least one other wireless device, additional information indicating that the CTS message has been transmitted to the second wireless device. The additional information may be beamformed to each wireless device of the at least one other wireless device in each of the determined spatial directions other than the first spatial direction. In another aspect, the additional information may include a duration associated with the CTS message. In another configuration, the RTS message may include a duration field, and the apparatus may include means for setting a NAV based on the duration field in the RTS message. In this configuration, the CTS message may be beamformed to the second wireless device after the NAV has expired. In another aspect, the duration field may indicate the duration of the RTS message. In another configuration, a NAV may be transmitted in the CTS message via beamforming, and the apparatus may include means for receiving the data transmission based on the NAV included with the CTS message. In another aspect, the NAV may indicate the duration of the CTS message. In another aspect, the apparatus may be one of a base station, an access point, a relay, a UE, or a CPE. In another aspect, the second wireless device may be one of a base station, an access point, a relay, a UE, or a CPE. In another aspect, the information may be transmitted during an announcement transmission interval. In another aspect, the information may be transmitted via a PDCCH. In another aspect, a set of bits may be reserved within the DCI of the PDCCH to indicate the information. In another aspect, the information may be transmitted via RRC signaling.

In one configuration, the aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

In another configuration, the aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
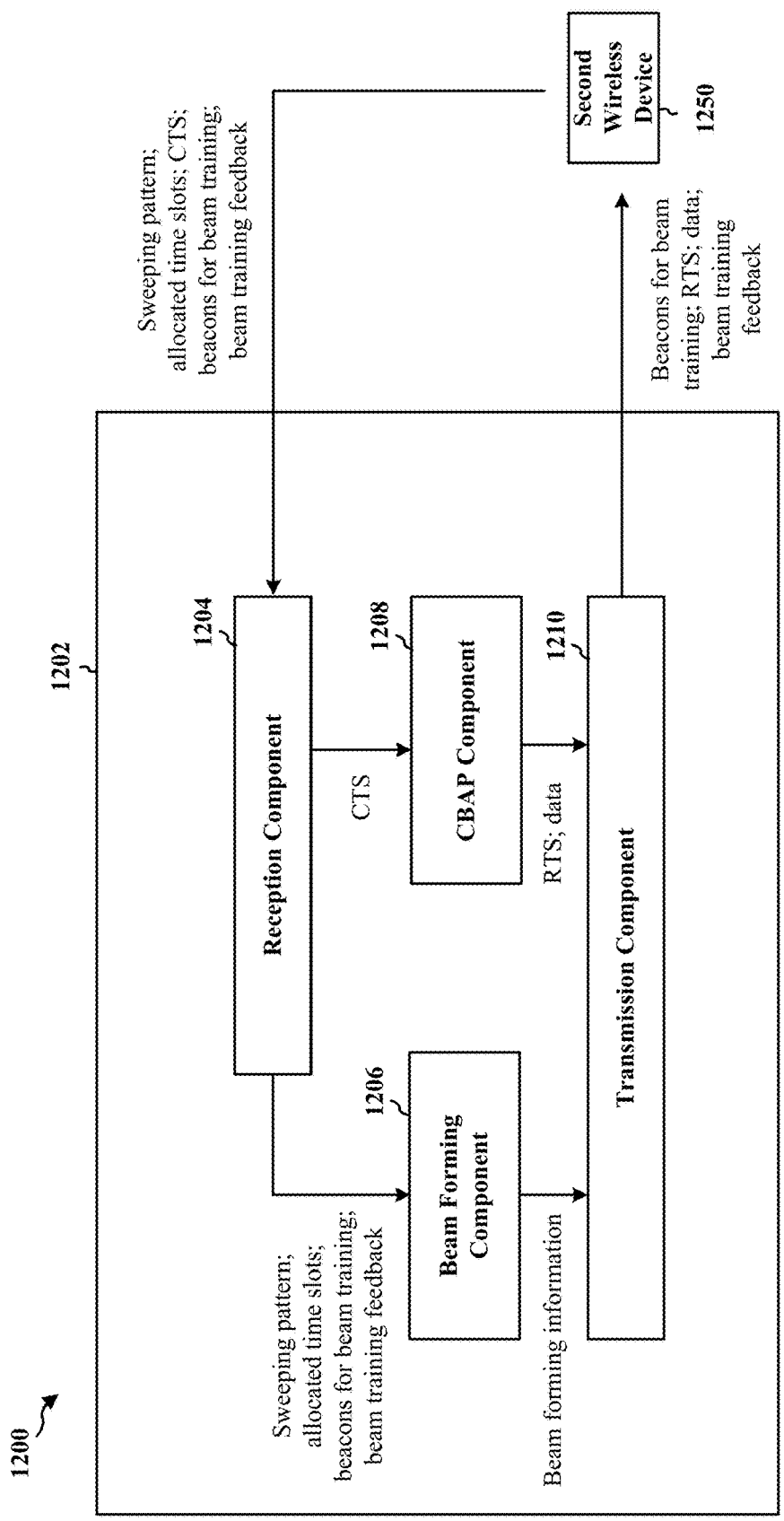
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a UE, a base station, or another device (e.g., the UE 722 or the second base station 720). The apparatus includes a reception component 1204, a beam forming component 1206, a CBAP component 1208, and a transmission component 1210. The reception component 1204 may be configured to receive, from a second wireless device, information indicating a sweeping pattern of the second wireless device and at least one time slot during which the second wireless device will listen to transmissions from the first wireless device. The transmission component 1210, the beam forming component 1206, and/or the CBAP component 1208 may be configured to transmit an RTS message, during the at least one time slot, to the second wireless device in at least one spatial direction based on the sweeping pattern. The reception component 1204 and/or the CBAP component 1208 may be configured to receive, in response to the transmitted RTS message, a CTS message in a spatial direction associated with the sweeping pattern. The CTS message may indicate that a data transmission can be sent. In an aspect, the RTS message may include a duration field, and the CTS message may be received based on the duration field of the RTS message. In another configuration, the CTS message may include a duration field. In this configuration, the CBAP component 1208 may be configured to set a NAV based on the duration field in the CTS message, and the transmission component 1210 may be configured to transmit the data transmission after the NAV has expired. In another aspect, the apparatus may be one of a base station, an access point, a relay, a UE, or a CPE. In another aspect, the second wireless device may be one of a base station, an access point, a relay, a UE, or a CPE. In another aspect, the information may be received during an announcement transmission interval. In another aspect, the information may be received via a PDCCH. In this aspect, a set of bits may be reserved within the DCI of the PDCCH to indicate the information. In another aspect, the information may be received via RRC signaling. In another configuration, the reception component 1204 may be configured to receive, via a beamformed transmission from a third wireless device, a CTS message that includes a duration field associated with the CTS message. In this configuration, the CBAP component 1208 may be configured to set a NAV based on the duration field of the received CTS message.

The apparatus may include additional components that perform each of the blocks of the algorithm in the aforementioned flowcharts of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
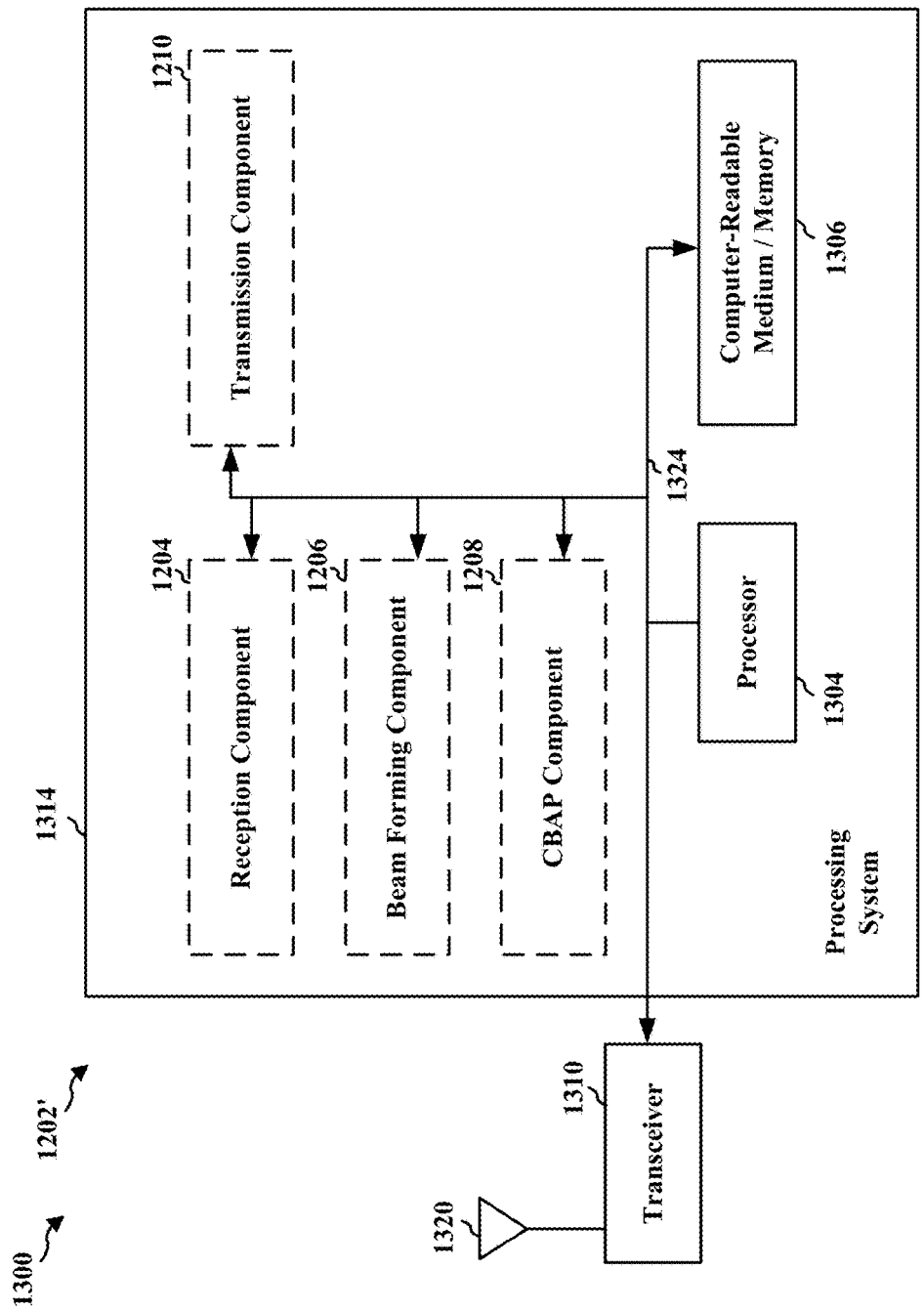
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1210, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210. The components may be software components running in the processor 1304, resident/stored in the computer readable medium/memory 1306, one or more hardware components coupled to the processor 1304, or some combination thereof.

In one configuration, the processing system 1314 may be a component of the base station 310 and may include the memory 376 and/or at least one of the TX processor 316, the RX processor 370, and the controller/processor 375.

In another configuration, the processing system 1314 may be a component of the UE 350 and may include the memory 360 and/or at least one of the TX processor 368, the RX processor 356, and the controller/processor 359.

In one configuration, the apparatus 1202/1202' for wireless communication includes means for receiving, from a second wireless device, information indicating a sweeping pattern of the second wireless device and at least one time slot during which the second wireless device will listen to transmissions from the first wireless device. The apparatus may include means for transmitting an RTS message, during the at least one time slot, to the second wireless device in at least one spatial direction based on the sweeping pattern. The apparatus may include means for receiving, in response to the transmitted RTS message, a CTS message in a spatial direction associated with the sweeping pattern. The CTS message may indicate that a data transmission can be sent. In an aspect, the RTS message may include a duration field, and the CTS message may be received based on the duration field of the RTS message. In another configuration, the CTS message may include a duration field. In this configuration, the apparatus may include means for setting a NAV based on the duration field in the CTS message, and means for transmitting the data transmission after the NAV has expired. In another aspect, the apparatus may be one of a base station, an access point, a relay, a UE, or a CPE. In another aspect, the second wireless device may be one of a base station, an access point, a relay, a UE, or a CPE. In another aspect, the information may be received during an announcement transmission interval. In another aspect, the information may be received via a PDCCH. In this aspect, a set of bits may be reserved within the DCI of the PDCCH to indicate the information. In another aspect, the information may be received via RRC signaling. In another configuration, the apparatus may include means for receiving, via a beamformed transmission from a third wireless device, a CTS message that includes a duration field associated with the CTS message. In this configuration, the apparatus may include means for setting a NAV based on the duration field of the received CTS message.

In one configuration, the aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

In another configuration, the aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a first wireless device, comprising:
    determining spatial directions of a plurality of wireless devices including a second wireless device and at least one other wireless device;
    selecting a sweeping pattern of the first wireless device indicating one or more angular regions for receiving signals from the second wireless device based on the determined spatial directions;
    transmitting, to the second wireless device, information including the sweeping pattern of the first wireless device and at least one time slot during which the first wireless device will listen to transmissions from the second wireless device;
    performing, based on the determined spatial directions and the transmitted information, a beam sweep for receiving one or more request to send (RTS) messages, wherein performing the beam sweep comprises listening for an RTS message based on the selected sweeping pattern during the at least one time slot;
    determining that the RTS message for a data transmission is received from the second wireless device at a first spatial direction of the determined spatial directions, wherein the RTS message includes a duration field;
    setting a network allocation vector (NAV) based on the duration field in the RTS message; and
    transmitting a clear to send (CTS) message to authorize the data transmission from the second wireless device, wherein the CTS message is beamformed to the second wireless device after the NAV based on the duration field in the RTS message has expired.

2. The method of claim 1, wherein the CTS message is transmitted in a beamformed manner in the first spatial direction.

3. The method of claim 1, wherein the CTS is transmitted in an omni-directional manner.

4. The method of claim 1, further comprising transmitting, to the at least one other wireless device, additional information indicating that the CTS message has been transmitted to the second wireless device, the additional information being beamformed to each wireless device of the at least one other wireless device in each of the determined spatial directions other than the first spatial direction.

5. The method of claim 4, wherein the additional information includes a duration associated with the CTS message.

6. The method of claim 1, wherein the duration field indicates the duration of at least the RTS message.

7. The method of claim 1, wherein a network allocation vector (NAV) included with the CTS message is transmitted in the CTS message via beamforming, the method further comprising receiving the data transmission based on the NAV included with the CTS message.

8. The method of claim 7, wherein the NAV included with the CTS message indicates the duration of the CTS message.

9. The method of claim 1, wherein the first wireless device is one of a base station, an access point, a relay, a user equipment (UE), or a customer premises equipment (CPE).

10. The method of claim 1, wherein the second wireless device is one of a base station, an access point, a relay, a user equipment (UE), or a customer premises equipment (CPE).

11. The method of claim 1, wherein the information is transmitted during an announcement transmission interval.

12. The method of claim 1, wherein the information is transmitted via a physical downlink control channel (PDCCH).

13. The method of claim 12, wherein a set of bits are reserved within downlink control information (DCI) of the PDCCH to indicate the information.

14. The method of claim 1, wherein the information is transmitted via radio resource control (RRC) signaling.

15. A first wireless device for wireless communication, comprising:
    means for determining spatial directions of a plurality of wireless devices including a second wireless device and at least one other wireless device;
    means for selecting a sweeping pattern of the first wireless device indicating one or more angular regions for receiving signals from the second wireless device based on the determined spatial directions;
    means for transmitting, to the second wireless device, information including the sweeping pattern of the first wireless device and at least one time slot during which the first wireless device will listen to transmissions from the second wireless device;
    means for performing, based on the determined spatial directions and the transmitted information, a beam sweep for receiving one or more request to send (RTS) messages, wherein performing the beam sweep comprises listening for an RTS message based on the selected sweeping pattern during the at least one time slot;
    means for determining that the RTS message for a data transmission is received from the second wireless device at a first spatial direction of the determined spatial directions, wherein the RTS message includes a duration field;
    means for setting a network allocation vector (NAV) based on the duration field in the RTS message; and
    means for transmitting a clear to send (CTS) message to authorize the data transmission from the second wireless device, wherein the CTS message is beamformed to the second wireless device after the NAV has expired.

16. The first wireless device of claim 15, wherein the CTS message is transmitted in a beamformed manner in the first spatial direction.

17. The first wireless device of claim 15, wherein the CTS is transmitted in an omni-directional manner.

18. The first wireless device of claim 15, further comprising means for transmitting, to the at least one other wireless device, additional information indicating that the CTS message has been transmitted to the second wireless device, the additional information being beamformed to each wireless device of the at least one other wireless device in each of the determined spatial directions other than the first spatial direction.

19. The first wireless device of claim 18, wherein the additional information includes a duration associated with the CTS message.

20. The first wireless device of claim 15, wherein the duration field indicates the duration of at least the RTS message.

21. The first wireless device of claim 15, wherein a network allocation vector (NAV) included with the CTS message is transmitted in the CTS message via beamforming, the first wireless device further comprising means for receiving the data transmission based on the NAV included with the CTS message.

22. The first wireless device of claim 21, wherein the NAV included with the CTS message indicates the duration of the CTS message.

23. The first wireless device of claim 15, wherein the first wireless device is one of a base station, an access point, a relay, a user equipment (UE), or a customer premises equipment (CPE).

24. The first wireless device of claim 15, wherein the second wireless device is one of a base station, an access point, a relay, a user equipment (UE), or a customer premises equipment (CPE).

25. The first wireless device of claim 15, wherein the information is transmitted during an announcement transmission interval.

26. The first wireless device of claim 15, wherein the information is transmitted via a physical downlink control channel (PDCCH).

27. The first wireless device of claim 26, wherein a set of bits are reserved within downlink control information (DCI) of the PDCCH to indicate the information.

28. The first wireless device of claim 15, wherein the information is transmitted via radio resource control (RRC) signaling.

29. A first wireless device for wireless communication, comprising:
   a memory; and
   at least one processor coupled to the memory and configured to:
      determine spatial directions of a plurality of wireless devices including a second wireless device and at least one other wireless device;
      select a sweeping pattern of the first wireless device indicating one or more angular regions for receiving signals from the second wireless device based on the determined spatial directions;
      transmit, to the second wireless device, information including the sweeping pattern of the first wireless device and at least one time slot during which the first wireless device will listen to transmissions from the second wireless device;
      perform, based on the determined spatial directions and the transmitted information, a beam sweep for receiving one or more request to send (RTS) messages, wherein performing the beam sweep comprises listening for an RTS message based on the selected sweeping pattern during the at least one time slot;
      determine that the RTS message for a data transmission is received from the second wireless device at a first spatial direction of the determined spatial directions, wherein the RTS message includes a duration field;
      set a network allocation vector (NAV) based on the duration field in the RTS message; and
      transmit a clear to send (CTS) message to authorize the data transmission from the second wireless device, wherein the CTS message is beamformed to the second wireless device after the NAV has expired.

30. The first wireless device of claim 29, wherein the CTS message is transmitted in a beamformed manner in the first spatial direction.

31. The first wireless device of claim 29, wherein the CTS is transmitted in an omni-directional manner.

32. The first wireless device of claim 29, wherein the at least one processor is further configured to transmit, to the at least one other wireless device, additional information indicating that the CTS message has been transmitted to the second wireless device, the additional information being beamformed to each wireless device of the at least one other wireless device in each of the determined spatial directions other than the first spatial direction.

33. The first wireless device of claim 32, wherein the additional information includes a duration associated with the CTS message.

34. The first wireless device of claim 29, wherein the duration field indicates the duration of at least the RTS message.

35. The first wireless device of claim 29, wherein a network allocation vector (NAV) included with the CTS message is transmitted in the CTS message via beamforming, the wherein the at least one processor is further configured to receive the data transmission based on the NAV included with the CTS message.

36. The first wireless device of claim 35, wherein the NAV included with the CTS message indicates the duration of the CTS message.

37. The first wireless device of claim 29, wherein the first wireless device is one of a base station, an access point, a relay, a user equipment (UE), or a customer premises equipment (CPE).

38. The first wireless device of claim 29, wherein the second wireless device is one of a base station, an access point, a relay, a user equipment (UE), or a customer premises equipment (CPE).

39. The first wireless device of claim 29, wherein the information is transmitted during an announcement transmission interval.

40. The first wireless device of claim 29, wherein the information is transmitted via a physical downlink control channel (PDCCH).

41. The first wireless device of claim 40, wherein a set of bits are reserved within downlink control information (DCI) of the PDCCH to indicate the information.

42. The first wireless device of claim 29, wherein the information is transmitted via radio resource control (RRC) signaling.

43. A non-transitory computer-readable medium of a first wireless device storing computer executable code, comprising code to:
   determine spatial directions of a plurality of wireless devices including a second wireless device and at least one other wireless device;
   select a sweeping pattern of the first wireless device indicating one or more angular regions for receiving signals from the second wireless device based on the determined spatial directions;
   transmit, to the second wireless device, information including the sweeping pattern of the first wireless device and at least one time slot during which the first wireless device will listen to transmissions from the second wireless device; and
   perform, based on the determined spatial directions and the transmitted information, a beam sweep for receiving one or more request to send (RTS) messages, wherein performing the beam sweep comprises listening for an RTS message based on the selected sweeping pattern during the at least one time slot;
   determine that the RTS message for a data transmission is received from the second wireless device at a first spatial direction of the determined spatial directions, wherein the RTS message includes a duration field;
   set a network allocation vector (NAV) based on the duration field in the RTS message; and transmit a clear to send (CTS) message to authorize the data transmission from the second wireless device, wherein the CTS message is beamformed to the second wireless device after the NAV based on the duration field in the RTS message has expired.

\* \* \* \* \*